# 3,124,467
METHOD OF TREATING EDIBLE ANIMAL CARCASSES

Beverly E. Williams, La Grange Park, Ill., assignor, by mesne assignments, to Hodges Development Corporation, New York, N.Y., a corporation of Delaware
No Drawing. Filed Mar. 15, 1960, Ser. No. 15,069
9 Claims. (Cl. 99—174)

This invention relates to the clothing of edible animal carcasses, and more particularly provides a novel and improved method for clothing such carcasses.

In the preparation of edible animal meat for marketing, after slaughtering, the animal carcasses are skinned and chilled. Beef is customarily clothed in a heavy moist shroud cloth while it is being chilled. Veal and lamb carcasses may or may not be so clothed. The wet shroud cloth is used to smooth and bleach the surface fat of the carcass and also to increase the "bloom" of the meat. Usually the bath in which the shroud cloth is wet before application to the carcass is an aqueous solution, generally a brine solution.

In my Patent 2,842,011, I have described the use of a shroud comprising at least a major proportion of ramie for clothing meat carcasses. Ramie is superior to cotton as a material for such shrouds for many reasons, and ramie shrouds outlast cotton shrouds up to ten to one.

Because of the superior strength of ramie, the ramie weaves used for carcass shrouds can be and usually are relatively coarse, ordinarily around 24 square weave as compared to generally 48 square weave for cotton shrouds. This coarse weave is desirable for shroud cloths. The cloths are wetted and then pinned to the carcasses by means of skewer-like metal clothing pins. Cotton fabrics used as shroud cloths are usually quite tightly woven. When the steel pins are thrust through such a cotton shroud cloth to fasten it to a carcass, the pins almost always tear or break threads of the cloth. The cotton cloth then tears at the broken threads, and fails. More cotton shrouds tear out than wear out. The open weave of a ramie shroud, on the other hand, permits ready insertion of the pins between the threads, thus avoiding tearing. The addition of ramie to a cotton or linen shroud cloth adds greatly to its strength and makes possible a coarser or more open mesh-like weave.

It is not only the greater strength of ramie, but also its greater absorbency which makes it possible to use a coarser weave when a shroud cloth contains ramie. It is important that the meat be prevented from drying out during chilling. To maintain the necessary moisture content in the shroud cloth has required the use of a much tighter weave in a cotton shroud than in one containing ramie. Ramie shrouds can contain 50% less threads per inch than a cotton shroud and still retain as much or more water.

However, ramie shrouds occasionally exhibit characteristics which detract from the desirable appearance of the meat carcass.

Thus, the open weave of a ramie shroud sometimes leaves a mesh-like mark on the carcass fat surface. To avoid this by tightening the weave would lose the above-described advantage of permitting easy insertion of the skewering pins. It would also increase the cost of the cloth.

Ramie is also a relatively coarse fiber as compared to cotton, and contains many protruding loose ends of fiber. When a ramie shroud cloth is applied to a meat carcass, particularly when the shroud is new, fuzz and lint may be deposited on the meat surface. Also, repeated laundering of ramie shrouds tends to make its fibers brittle and more easily breakable. The appearance of deposits of lint from the ramie on the meat surface is undesirable.

Moreover, neither ramie nor cotton shrouds prevent shrinkage of the animal carcasses when they are moistened in accordance with the present practices of the meat slaughtering industry. There is a constant loss of weight in meat during initial chilling and chilled storage. Since meat is sold by weight, this loss of weight is reflected in an increase in the price for which the meats in a carcass must be sold. There is accordingly a demand in the meat industry for processes by which meat shrinkage can be reduced. However, a limitation on the processes which can be adopted is that any foreign substance applied to meat carcasses must be completely edible. Thus, the bath in which a shroud cloth is moistened, for example, must be of such a composition that the surfaces to which it is applied are subsequently safe for human consumption.

It is the principal object of the present invention to provide a novel method for clothing edible animal carcasses, such as beef, lamb and veal, which provides important advantages over means hitherto employed.

Another object of the invention is to provide a means of shrouding or clothing edible animal carcasses with shroud cloths of more open, less costly weave and construction and yet prevent the appearance of mesh-like marks on the finished fat surface, especially of beef.

Another object of the present invention is to provide a novel means of clothing edible animal carcasses with shrouds comprising ramie whereby the appearance of mesh marks on the carcass surface and deposits of fuzz and lint from the ramie fibers are avoided.

A further object of the present invention is to provide a novel method of clothing edible animal carcasses which produces a brighter and more bleached fat surface.

Another object is to provide a method of producing a novel, attractive, wax-like appearance and feel on the fat surface of edible animal carcasses, particularly beef carcasses.

Another object is to provide a novel method of reducing meat shrinkage.

Another object of this invention is to provide novel baths for moistening shrouds to be applied to edible animal carcasses, and novel compositions adapted to produce such baths.

These and other objects, including the provision of a novel article comprising an improved moistened shroud for clothing edible animal carcasses, will become evident from a consideration of the following specification and claims.

In accordance with this invention, an edible animal carcass is clothed with a shroud moistened with an aqueous solution comprising at least one edible, water-soluble material selected from the class consisting of water-soluble cellulose ethers, gelatin, and water-soluble polyhydric aliphatic alcohols of from 3 to 6 carbon atoms containing at least three alcoholic hydroxyl groups.

I have found that inclusion of a water-soluble cellulose ether in the aqueous solution with which a coarsely woven shroud is moistened prevents the appearance of mesh marks on carcasses clothed in such shrouds. Furthermore, it increases the water pick-up by the shrouds and decreases the water loss rate. Moreover, when such a coarsely woven shroud comprises ramie, the appearance of deposits of lint and fibers on the carcass is eliminated. Additionally, use of an aqueous solution comprising such a cellulose ether to wet a coarsely woven shroud comprising ramie gives improved bleaching of the carcass fat, imparts an attractive wax-like feel and appearance to the fat surface of the carcass, and reduces shrinkage of the meat in the carcass.

I have further found that gelatin, a water-soluble polyhydric aliphatic alcohol of from 3 to 6 carbon atoms containing at least three alcoholic hydroxyl groups, or both, can be used advantageously as components of aqueous solutions used to wet coarsely woven shrouds as a replacement for or supplement to the brines conventionally used to wet shrouds for clothing animal carcasses.

It has traditionally been believed that brine is used instead of plain water to wet shrouds in order to take advantage of the bactericidal and fungicidal qualities of brine. However, I have discovered that this is not its actual function. In the first place, at least in the amounts and concentrations permitted, brine is not effective in controlling growth of microorganisms on the shrouded carcass. In the second place, the shrouds are removed from the carcasses after one or two days, which is too short a time to permit bacteria or fungi to develop.

Instead, I have found, the function of brine is to keep the shroud more moist than it would be if it were moistened only with water. Brine does this because salt is hygroscopic. The hygroscopic action of the brine draws and holds moisture in the shroud. Some of the moisture comes from the nearly saturated atmosphere in the cooler where the shrouded carcasses are kept, which is desirable, and some comes from the carcass itself, which is not so desirable.

Having discovered that it is the hygroscopic action of the aqueous medium used to wet the shroud which is important, I have now provided improved aqueous solutions for accomplishing the result of keeping shrouds moist, such aqueous solutions comprising a water-soluble cellulose ether, gelatin, a water-soluble polyhydric aliphatic alcohol of the above-stated nature, or combinations of the same. These solutions are more effective hygroscopic agents than brine. They are so effective, in fact, that they make it possible to use a coarse weave for a shroud consisting of a fiber like cotton, which is relatively non-absorbent as compared to a fiber like ramie.

If brine is used to wet a shroud consisting of a poorly absorbent fiber like cotton, as has been the practice hitherto, the shroud must be tightly woven. If it has a coarse weave, it dies out too fast, and sticks to the carcass. The solutions comprising a water-soluble cellulose ether, gelatin and/or a water-soluble, polyhydric aliphatic alcohol employed in accordance with this invention, on the other hand, keep such shrouds moist. Similarly, where a shroud does comprise an absorbent fiber like ramie, it in turn can have a coarser weave than would otherwise be needed. This is an economically important advance in the art because a coarser weave, with less threads per inch, is cheaper to make. Moreover, the pins used to skewer shrouds to carcasses can be inserted through a coarse weave without tearing threads, whereas the threads of cotton shrouds of the tight weave now used are torn by these pins, which causes the shrouds to tear out after a time, and become useless.

Moreover, an aqueous solution comprising gelatin as used in accordance with this invention has the further advantage that it tends to seal the interstices of the cloth and decreases the amount of shrinkage in the meat of a carcass wrapped in shrouds moistened therewith, thus increasing the weight of saleable meat obtained.

An aqueous solution comprising a polyhydric alcohol employed to wet a shroud in accordance with this invention has been found to produce an unusual sheen on the fat surface of the carcass which enhances the attractiveness of its appearance.

When an aqueous solution comprising both of the above-discussed materials is employed to wet shrouds, the gelatin and the polyhydric alcohol act synergistically as hygroscopic agents, and also produce the stated effects of reducing drying and shrinkage of the meat together with giving an attractive shine to the fat surface of a carcass.

Additionally, when an aqueous solution comprising the gelatin and/or the polyhydric alcohol is employed to wet a shroud comprising ramie, then, like aqueous solutions comprising a water-soluble cellulose ether as discussed above, they tend to mat down recalcitrant fibers of ramie and prevent lint from depositing.

Particularly effective results in producing carcasses with improved appearance and reduced meat shrinkage are obtained when an aqueous solution comprising each of the three above-discussed ingredients—a water-soluble cellulose ether, gelatin, and a water-soluble polyhydric aliphatic alcohol—is used to wet a coarsely woven shroud including shrouds made of ramie, part-ramie, cotton, and so forth.

It is sometimes convenient and advantageous to combine the afore-stated ingredients with other substances in the aqueous solution used to wet shrouds, and particularly, to combine them with edible salt (sodium chloride). Dry compositions which can conveniently be used to prepared such aqueous solutions are provided by this invention, such compositions comprising dry mixtures of salt, dry powdered gelatin and a dry, powdered, water-soluble edible cellulose ether, in specific proportions to one another adapted to produce the stated solutions, as will further appear hereinafter.

From the foregoing discussion, it will be evident that this invention provides numerous and important advantages, including the elimination of disadvantages encountered when shrouds including ramie are used; the provision of means for reducing the closeness of weave required in shroud cloths and thus decreasing the shroud cost while also diminishing its liability to tearing by skewer pins inserted through it; the improvement of the appearance of the fat surface of animal carcasses; the reduction in shrinkage of meat undergone by edible animal carcasses, and so forth.

The solution used to moisten a shroud cloth to be applied to a carcass in accordance with the method of this invention will be an aqueous solution comprising at least one edible, water-soluble, material selected from the class consisting of water-soluble cellulose ethers, gelatin and water-soluble polyhydric aliphatic alcohols of from 3 to 6 carbon atoms containing at least three alcoholic hydroxyl groups.

The cellulose ethers which may be used in the practice of this invention are edible, water-soluble cellulose derivatives in which the cellulose molecule is attached by ether oxygen atoms to lower alkylene radicals. Exemplary of such cellulose ethers are alkyl cellulose ethers such as methyl cellulose ether, and substituted alkylene cellulose ethers such as hydroxyethyl cellulose and sodium salts of carboxymethyl cellulose ethers. I have found that the objects of this invention can be obtained particularly effectively when the cellulose ether used is an alkali metal salt of a carboxyalkyl cellulose ether. Illustrative of such cellulose ethers are, for example the sodium salt of carboxymethyl cellulose ether, the potassium salt of carboxymethyl cellulose ether, the lithium salt of carboxymethyl cellulose ether, the sodium salt of carboxyethyl cellulose ether, the sodium salt of carboxypropyl cellulose ether, and so forth. A particularly preferred ether of this type for the present purposes is cellulose glycolate, which is the sodium salt of a carboxymethyl ether of cellulose.

Cellulose is a natural polymer comprising a chain of anhydroglucose ($C_6H_{10}O_5$) units. There are three reactive hydroxyl groups on each anhydroglucose unit. To prepare cellulose glycolate, as is well known in the art, cellulose is treated with alkali to convert at least some of the stated hydroxyl groups to the sodium salts thereof; and the resulting alkali cellulose is then reacted with sodium monochloracetate to produce substitution of carboxymethyl groups on the cellulose molecule, as illustrated by the following equation:

$$RONa + ClCH_2COONa \rightarrow ROCH_2COONa (+NaCl)$$

where "R" represents the cellulose structure. The product is the cellulose derivative referred to herein as cellulose glycolate.

Usually less than the total number of hydroxyl groups in the cellulose molecule are converted by the stated reaction to the glycolate salt. There is a correlation between the degree of substitution and the water solubility of the product, and this factor may be varied to produce different grades of the cellulose glycolate. In general, for the present purposes, useful grades include a grade in which the degree of substitution is from about 1 to about 1.5 and more specifically, in the range of from about 1.20 to about 1.40—that is, approximately, 1.20–1.40 out of each 3 hydroxyl groups per anhydroglucose unit in the cellulose chain have been converted to the glycolate salt—and also a grade with a degree of substitution in the range of from about 0.50 to about 1.00, and more specifically, from about 0.65 to about 0.85 or 0.95.

Variation in degree of polymerization of the cellulose chain also has an important influence on properties of the cellulose glycolate, specifically, on the viscosity of its solutions. The presently useful types of cellulose glycolate include products of widely varying viscosity, ranging, for example, from a product having a viscosity of 200–800 centipoises at 25° C. at a 2% concentration to one having a viscosity of 1300–2200 centipoises at 25° C. at a 1% concentration (in water). Since the present invention relates to preparation of a food product, the type of cellulose glycolate employed will be that sold for use in foods, drugs and cosmetics, of a degree of purity which is safe for oral ingestion.

The concentration of the cellulose ether in the aqueous medium with which the shroud is moistened may vary widely. Generally concentrations so high as to produce immediate gelling of the aqueous medium will be avoided. Very low concentrations, on the other hand, have sometimes been observed to cause the shroud to stick to the carcass, which is undesirable. Effective concentrations for the practice of the invention may vary with the type of cellulose ether used. Usually a concentration of from about 0.08 to about 8% by weight will be employed. Preferably, the concetration used will be in the range of from about 0.25 to about 2.5% by weight. Generally less of a high viscosity type will be used than one of a lower viscosity type of cellulose glycolate; for example, a concentration of about 0.5% by weight is preferred when the cellulose glycolate is one having a viscosity of 1300–2250 centipoises at 25° C. at 1% concentration, while a concentration of about 1.6% by weight is preferred when the cellulose glycolate is one having a viscosity of 200–800 centipoises at 25° C. at 2% concentration in water.

The second type of edible, water-soluble, material useful in the practice of this invention is gelatin. Any of a wide variety of grades and types of water-soluble gelatin may be used for the present purposes. In particular, the edible gelatin sold for household preparation of gelatin foods, for example, is suitable for use in the present connection. The concentration of the gelatin in the aqueous solution to be applied to shrouds in the practice of this invention may vary widely, depending on the viscosity produced by a given concentration of the selected type of gelatin, on the materials with which it is associated in solution, and so forth. Usually it will range from about 0.01% to about 5%, and preferably from about 0.5% to about 1.0% by weight, for example. A concentration of about 0.8% by weight of edible gelatin has been found to give excellent results.

The third type of edible, water-soluble material to be used in the practice of this invention is a water-soluble polyhydric aliphatic alcohol of from 3 to 6 carbon atoms containing at least three alcoholic hydroxyl groups. The ratio of oxygen to carbon in such alcohols will preferably be at least 1:1. Illustrative of presently useful alcohols are, for example, hydrocarbyl polyols such as glycerine (gycerol), pentaerythritol, and sorbitol, mannitol, dulcitol and the like. Also included in the class of polyhydric alcohols conforming to the stated characteristics are certain derivatives of hydrocarbyl polyols like diglycerol, sorbitan and sugars such as glucoses. A preferred polyhydric alcohol for use in the present connection is glycerine.

The concentration of the polyhydric alcohol in the aqueous solution may vary, depending on its nature and also on the materials with which it is associated in the solution. Generally, from about 0.15% to about 15% by weight and preferably from about 1% to about 10%, will be used. For glycerine, for example, about 5% by weight is found to give good results.

An aqueous solution comprising one or more of the above-discussed types of edible, water-soluble materials will moisten the shroud applied to an edible animal carcass in accordance with the method of this invention.

The aqueous solution may also comprise additional components, if desired. In particular, it may comprise materials conventionally used in the meat slaughtering industry as components of the aqueous medium used to moisten shrouds which are to be applied to animal carcasses. These include, for example, salt in concentrations producing brines giving 5–20° salometer readings at 60° F.; sodium hypochlorite, in a concentration of 100–200 parts per million; acetic acid in a concentration of 1–2%, and so forth. Brines which are even more concentrated than the mentioned salometer readings may be used where the shrouds comprise ramie, which, because it is more absorbent than cotton, reduces the risk of the salt crystallizing out. Usually, however, the concentration of salt when brines are employed will be that corresponding to 20° salometer at 60° F., which is equal to about 5% by weight. Illustrative of bath compositions used to wet the shroud in accordance with this invention, for example, is a bath consisting of a 20° salometer brine containing from about 0.5 to about 2.5 oz. of cellulose glycolate, from about 0.5 oz. to about 1.5 oz. of powdered edible gelatin and approximately 5 to 10 oz. of liquid glycerine per gallon.

Baths to be used to wet shrouds for the practice of this invention will be prepared by simply dissolving the selected materials in the selected aqueous medium. As is known in the art, cellulose glycolate may tend to agglomerate upon rapid addition to an aqueous medium and the rate of addition thereof will accordingly be controlled, to a speed depending on the mixing technique used, so as to achieve complete solution. Pre-dissolving in a Waring-type blendor has been found helpful. Similar precautions to avoid incomplete solution will be observed in preparing other aqueous media for the practice of the method of this invention, such as solutions of cellulose glycolate or gelatin in water, in aqueous solutions of mold-inhibiting agents like sodium hypochlorite, and so forth.

It will sometimes be convenient to provide a dry premix of the solid bath components, to obviate the need of handling and weighing several ingredients separately. The edible, water-soluble materials used as bath components in accordance with this invention which are solids and adapted for incorporation in a dry pre-mix are the water-soluble cellulose ethers and gelatin. Salt will advantageously and preferably be included in such a premix, whereby solution of the pre-mix in water will provide a brine solution of the edible, water-soluble material. A composition particularly contemplated in this connection is a mixture comprising a water-soluble cellulose ether, gelatin and salt, in proportions adapted to provide an aqueous solution thereof in the respective concentrations stated hereinabove. Thus, such a dry pre-mix will comprise, broadly stated, from about 0.08 to about 8 parts by weight of dry, water-soluble cellulose ether and from about 0.01 to about 5 parts by weight of dry powdered gelatin per 5 parts of salt. Preferably the stated composition will comprise from about 0.25 to about 2.5 parts by weight of dry, water-soluble cellulose glycolate and from about 0.5 to about 1.0 part by weight of dry, powdered gelatin per 5 parts of salt. An illustrative composition will consist, for example, of about 0.5 part by weight of a dry, water-soluble cellulose glycolate having a viscosity of 1300–2250 centipoises at 25° C. at 1% concentration (or alternatively, about 1.6 parts by weight of a dry, water-soluble cellulose glycolate having a viscosity of 200–800 centipoises at 25° C. at 2% concentration) and about 0.8 part by weight of dry, powdered gelatin per 5 parts of sodium chloride. The stated compositions may also comprise, where desired, other solid dry ingredients which are to be introduced into the aqueous bath to be applied to the shroud, such as the antibiotics disclosed in my copending application S.N. 15,070, filed March 15, 1960, herewith. In any case, whether or not it contains other substances influencing the properties of solutions thereof, the dry compositions will be adapted for dissolution in water to prepare aqueous baths useful in the practice of the present invention.

It is to be appreciated, of course, that this invention is not limited to baths prepared by dissolving compositions of the stated nature, but also includes the use of aqueous solutions of edible water-soluble materials dissolved individually or separately. Moreover, it is to be appreciated that additional bath components as set forth hereinabove, such as glycerine, may be introduced into aqueous solutions of the stated compositions.

Most conveniently, the aqueous medium comprising the selected edible, water-soluble material or combination of materials will be applied to the shroud by dipping. Other means of applying the aqueous solution to the shroud such as spraying or the like may be used if desired. The method used should in any case be such as to moisten the shroud thoroughly, producing an effective concentration of the materials dissolved in the aqueous solution within the shroud. In the practice of the method of the invention using a 2 oz./gal. cellulose glycolate concentration in a 20° salometer brine, for example, it is found that a 24 square weave ramie shroud producing the presently provided improved results gains 220% in weight, as compared to a gain in weight of only 90% when such a shroud is dipped in brine not containing the cellulose glycolate. In the dry state after removal from the carcass, it weighs 22.2 oz. The average of the cellulose glycolate concentrations determined in samples cut from the ends and center of the shroud is 1.8%. Thus, the calculated total add-on of cellulose glycolate from the bath containing 2.0 oz. of the glycolate per gallon is 0.4 oz. The calculated wet pick-up is 0.2 gal. or 120% based on the dry weight of the shroud. It is to be appreciated that the variations in the weave, yarn size and dimensions of the shroud may affect the amount of solution held by the shroud, and that the optimum concentration of cellulose glycolate or other material comprised in the solution in accordance with this invention may vary accordingly. In general, however, the method of the invention is not highly sensitive to small changes in the concentrations of the solutions applied to the shrouds, and the improved results provided hereby can readily be obtained over a broad range of operating conditions.

The shroud will consist of a woven cloth, made of any suitable fiber, such as cotton, linen, ramie, rayon, and so forth. Advantageously, it may comprise a major proportion of ramie, as described in my Patent 2,824,011. Either the warp or the fill yarns of the cloth may consist essentially of ramie itself. There are certain advantages in using a blend of ramie with other textile fibers, either natural like cotton, or synthetic like rayon. Cotton-ramie and linen-ramie blends are especially useful. Conventional textile weaving systems, especially linen weaving systems, can be used to make such ramie-containing shrouds. It is not necessary, however, that the shroud contain any ramie. It may for example be a cotton shroud, consisting entirely of cotton or consisting of cotton reinforced by inclusion of other fibers, such as ramie. The shroud will usually be a generally rectangular piece of cloth. Especially for use on sides of beef, dimensions of from about 72″ to about 120″ in length and from about 36″ to about 52″ in width are usual. It may have a selvedge edge, of heavier weave than the main body portion of the shroud, along one or both long edges, although this is not essential.

The yarn from which the fabric is woven may vary somewhat as to size. To produce the necessary strength, the yarn size will usually range between about 3000 and about 4000 yards of yarn per pound. A particularly suitable yarn count is one containing about 3200 yards per pound.

The present invention is particularly applicable to coarse weaves of shrouds. On the one hand, it makes it possible to use a coarse weave in a shroud made of cotton, which has not been possible hitherto because of the inadequate absorbency of cotton. On the other hand, it is especially useful in preventing the appearance of mesh marks and lint deposits when the shroud comprises ramie, which is usually prepared in a coarse weave. Coarse weaves will contain between about 15 and about 30 yarns and more particularly, between about 20 and 25 yarns in the warp and in the fill per inch. A weave of about 24 square is especially advantageous in permitting ready insertion of pins to fasten the shroud to the carcass.

In clothing a meat carcass in accordance with the present invention, the shroud, moistened with the aqueous medium comprising one or more of the edible, water-soluble materials employed in accordance with this invention, will be wrapped around the skinned surfaces of the carcass. The term "carcass" as used herein refers to the whole skinned and eviscerated edible animal body including sides (halves) as well as to wholesale portions thereof, such as quarters, foresaddles and hindsaddles. The carcass may be a beef, veal, or lamb (including sheep) carcass. The moist shroud is secured to the carcass by suitable means; usually it is self-bound to the legs of the carcass, and pinned to the edges of the visceral cavity. The clothed carcasses and sides are then transferred to a cooler in which a temperature of about 30–35° F. is maintained. When the carcass has been cooled to near this temperature, the shroud is removed and laundered, after which it will be ready for re-use.

The invention is illustrated but not limited by the following examples:

*Example I*

This example illustrates the use of an aqueous solution comprising gelatin as a shroud dip bath.

A ramie shroud cloth, of 24 square weave, was dipped in a solution of 1 oz./gal. of edible gelatin, and this shroud was applied to one side of a freshly slaughtered and skinned beef. The other side of the carcass was wrapped in a similar shroud cloth dipped in 20° salometer brine. Both sides were then placed in a cooler at a temperature of 30–35° F. and held overnight.

When the shrouds were removed from the sides on the following day, it was found that the shrouds were equally moist and that the side wrapped in the shroud dipped in the gelatin solution had undergone less meat shrinkage than the one wrapped in the shroud dipped in the brine solution.

*Example II*

This example illustrates the use of an aqueous solution of a polyhydric alcohol as a shroud dip bath.

The procedure of Example I, using ramie shroud cloths in a comparative test on two sides of a beef carcass, was repeated substituting 6 oz./gal. of glycerine for the gelatin of Example I.

It was found that the glycerine, like the gelatin, kept the shroud cloth as moist as did the brine solution. Additionally, it was observed that the chilled fat surface of the beef of the side treated with the shroud dipped in the glycerine solution had an unusual and attractive sheen.

*Example III*

This example illustrates the use of an aqueous solution comprising gelatin and a polyhydric alcohol as a shroud dip bath.

The procedure of Example I was repeated, using as the dip bath for the shroud applied to one side of the beef carcass an aqueous solution of 1 oz. of gelatin and 6 oz. of glycerine per gallon of water. The other side was wrapped in a shroud dipped in a 20° salometer brine solution.

It was found that the gelatin and glycerine acted synergistically in attracting and holding moisure, and keeping the shroud moist. Moreover, these materials produced an attractive smoothness and shine on the fat surface of the carcass, different from the appearance of the brine-treated side, and the meat of the side had undergone 1 pound less shrinkage than the meat on the side wrapped in the brine-moistened shroud.

*Example IV*

This example illustrates the use of aqueous solutions comprising a cellulose ether as a shroud dip bath, including aqueous solutions comprising a cellulose ether and also gelatin or a water-soluble polyhydric aliphatic alcohol.

Baths for shroud dipping were prepared comprising respectively:

(A) 20° salometer brine.
(B) 2 ounces of cellulose glycolate per gallon of 20° salometer brine.
(C) A brine solution of cellulose glycolate as described in (B) above, containing in addition 1 oz./gal. of the edible gelatin described in Example I.
(D) A brine solution of cellulose glycolate as described in (B) above, containing in addition ⅓ liter of glycerine per gallon.
(E) A brine solution of cellulose glycolate as described in (B) above, containing in addition 1% by weight acetic acid and 100 parts per million of sodium hypochlorite.

Freshly slaughtered and skinned beef carcasses, each divided into two sides, were wrapped in shrouds moistened with these solutions. One side of each of the carcasses was wrapped in a conventional 48 square weave, cotton shroud dipped in the 20° salometer brine identified as solution (A). The other sides of the carcasses were wrapped in used and new shrouds woven of ramie-linen, in a 24 square weave, moistened with the above-identified solutions, as indicated in the following table.

| Side 1 | | Side 2 | |
| --- | --- | --- | --- |
| Shroud Type | Bath Used | Shroud Type and Condition | Bath Used |
| Cotton | A | Part Ramie—new | A |
| Do | A | Do | B, C, D |
| Do | A | Part Ramie—old | A |
| Do | A | Do | B, C, D, E |

The carcasses were then transferred to a cooler in which the temperature of 30–35° F. was maintained, and held overnight. On the following day, the carcasses were transferred to the sales cooler, the shrouds were removed, and the sides were examined and compared.

In each case, the appearance of the part-ramie shrouded side was superior to that of the all-cotton-shrouded side; as stated in my Patent 2,824,011, ramie shrouds produce better bloom of the meat and more bleaching of the fat than cotton shrouds. However, the sides of the carcasses wrapped in the part-ramie shrouds dipped in bath A, consisting of brine, showed traces of mesh-like marks and some fuzz and lint on the fat surface. This was particularly evident on the carcass on which a new ramie shroud was used.

The carcass sides wrapped in part-ramie shrouds dipped in baths B, C, D, and E, containing cellulose glycolate, however, were entirely free of such markings or deposits. Moreover, they were clearly superior to the sides treated with the brine-dipped ramie shrouds in appearance. They were brighter and bleached more. The bloom of the beef was extraordinary. There were no mesh marks or weave or thread imprints on the surface fat.

Moreover, the fat surface had an attractive, unusual wax-like feel and appearance.

Additionally, these sides had the important advantage of exhibiting up to 1% less shrinkage. The savings in shrink existed not only after the overnight cooling, but also persisted even after unshrouding.

*Example V*

This example illustrates the use of an aqueous solution comprising a cellulose ether, gelatin and a water-soluble polyhydric aliphatic alcohol as a shroud dip bath.

Sides of whole carcasses of beef were wrapped separately in 100% ramie shrouds, of which the shrouds applied to one side were dipped in a 20° salometer brine bath (bath A) and those applied to the other side were dipped in a 20° salometer brine bath containing 1 oz./gal. gelatin, 5% by weight glycerine and the bacteria and mold inhibiting sodium hypochlorite (200 p.p.m.) and acetic acid (2% by weight), along with 2 oz./gal. of the cellulose glycolate described in Example IV. The shrouded carcasses were placed in a cooler overnight and then examined, as described in the above examples. Both new shrouds and shrouds which had been in service for a number of weeks were compared in this fashion. In each case, the side wrapped in the shroud dipped in the bath containing the cellulose glycolate, gelatin and glycerine was superior in appearance to that wrapped in the shroud dipped only in brine. The advantageous features of the inclusion of cellulose glycolate, gelatin and glycerine in the shroud dip bath stated in the preceding examples were evident in this direct comparison of shrouds of the same type on mate sides of the same carcasses.

A similar comparison of these baths conducted on veal and lamb carcasses also showed the superiority of a bath as provided by this invention to a bath consisting only of brine.

*Example VI*

This example illustrates the use of a shroud dip bath as provided by this invention on cotton shrouds.

The baths used in the tests described in this example had the following compositions:

(A) 20° salometer brine.
(B) 20° salometer brine containing 2 oz. per gallon of the cellulose glycolate described in Example IV.
(C) 20° salometer brine containing 2 oz. per gallon of the cellulose glycolate described in Example IV, 1 oz./gal. gelatin, 5% by weight glycerine, 200 p.p.m. sodium hypochlorite and 2% by weight acetic acid.

The shrouds used in these tests consisted of cotton. Shroud type 1 was a conventional, close-woven 100% cotton shroud cloth with a weave of about 48 square. Shroud type 2 was a basketweave 100% cotton shroud cloth with a weave of about 24 square.

Shrouds of type 1 and type 2 were moistened with the baths and applied to sides of freshly slaughtered beef carcasses, and the sides were cooled overnight.

The conventional weave cotton shrouds of type 1 dipped in baths B and C produced carcasses no better in appearance than mate sides wrapped in a type 1 shroud dipped in bath A. In fact, the sides on which baths B and C were used were somewhat smeary.

On the other hand, the coarsely woven type 2 cotton shroud dipped in bath C produced a carcass of superior appearance, with a shiny smooth fat surface, and less shrinkage than is undergone by a side wrapped in a type 1 shroud dipped in bath A.

*Example VII*

This example illustrates the improvement in water pick-up and retention obtained in accordance with this invention.

Pieces of washed ramie shroud cloth measuring 4 by 6 inches were weighed and then dipped in baths, at a temperature of 110° F., having the following compositions:

(1) Tap water
(2) Brine water (20° salometer)
(3) Tap water+0.5% high viscosity cellulose glycolate
(4) Brine water+1.5% medium viscosity cellulose glycolate
(5) Brine water+1.5% gelatin
(6) Brine water+1.5% medium viscosity cellulose glycolate+1.5% sorbitol
(7) Brine water+1.5% medium viscosity cellulose glycolate+1.5% glycerine The cellulose glycolate products employed here were a high viscosity type, about 0.65–0.85 substituted, with a viscosity at 1% concentration of 1300–2200 centipoises at 25° C., and a medium viscosity type, 0.65–0.95 substituted, viscosity at 2% concentration 200–800 centipoises at 25° C.

The dipped pieces were spread out in the bottom of weighed aluminum trays, and the cloth and tray were weighed. Subtraction of the weight of solution solids from the weight of solution picked up gave the weight of water picked up.

About 75% more water was picked up by the cloths dipped in the solutions containing cellulose glycolate than by the cloths dipped in the other baths.

The trays containing the cloths were placed in a refrigerator, equipped with a fan to provide air circulation, at an air temperature of 33–35° F. They were weighed at approximately hourly intervals. Accumulative water-loss, expressed as percent of total water pick-up, was calculated for each weighing time. It was found that after 10 hours, the cloths dipped in tap water (bath 1) and brine water (bath 2) had lost 95% of their water, whereas those dipped in tap water containing cellulose glycolate (bath 3) and in brine water containing cellulose glycolate (bath 4) had lost only 50% of their water content. The rate of water loss was as follows.

| Bath composition: | Water loss rate (g./hr.) |
|---|---|
| (1) Tap water | 0.96 |
| (2) Brine water | 0.84 |
| (3) Tap water+cellulose glycolate | 0.84 |
| (4) Brine water+cellulose glycolate | 0.75 |

The solution of gelatin in brine (bath 5) was intermediate in water loss between the tap and brine waters, on the one hand, and the solutions of cellulose glycolate, on the other: after 10 hours, between 70% and 80% of the water in the cloth dipped in this bath had been lost. The water loss rate for baths 6 and 7, containing a polyhydric alcohol in addition to cellulose glycolate, was about the same as that for bath 4.

While the invention has been illustrated with reference to specific embodiments thereof, it will be appreciated that modifications and variations are possible without departing from the scope of the invention.

What is claimed is:

1. An improved method of treating edible animal carcasses which comprises covering the skinned surface of the carcass with a woven cloth, having between about 15 and about 30 yarns per inch in the warp and fill, moistened with an aqueous solution comprising at least one edible, water-soluble material selected from the group consisting of water-soluble cellulose ethers, in a concentration between about 0.08 and about 8%, by weight; gelatin, in a concentration between about 0.01 and about 5%, by weight; and water-soluble polyhydric aliphatic alcohols of from 3 to 6 carbon atoms containing at least three alcoholic hydroxyl groups, in a concentration between about 0.15 and about 15%, by weight.

2. The method of claim 1 in which said edible, water-soluble material is cellulose glycolate.

3. The method of claim 1 in which said edible, water-soluble material is glycerine.

4. The method of claim 1 in which said edible, water-soluble material is gelatin.

5. The method of claim 1 in which said aqueous solution is a brine solution.

6. The method of claim 1 in which said animal carcass is a beef carcass.

7. The method of claim 1 in which said edible, water-soluble material is cellulose glycolate and glycerine.

8. The method of claim 7 in which said aqueous solution is a brine solution.

9. The method of claim 1 in which said woven cloth comprises ramie.

References Cited in the file of this patent

UNITED STATES PATENTS

| | | |
|---|---|---|
| 2,159,743 | Lotham et al. | May 23, 1939 |
| 2,235,798 | Collins et al. | Mar. 18, 1941 |
| 2,428,495 | Lesparre et al. | Oct. 7, 1947 |
| 2,682,097 | Wade | June 29, 1954 |
| 2,721,142 | Shinn et al. | Oct. 18, 1955 |
| 2,765,233 | Sarett et al. | Oct. 2, 1956 |
| 2,824,011 | Williams | Feb. 18, 1958 |
| 2,856,294 | Brown et al. | Oct. 14, 1958 |
| 2,979,410 | Parlour | Apr. 11, 1961 |
| 3,041,184 | Hartshorne | June 26, 1962 |